UNITED STATES PATENT OFFICE.

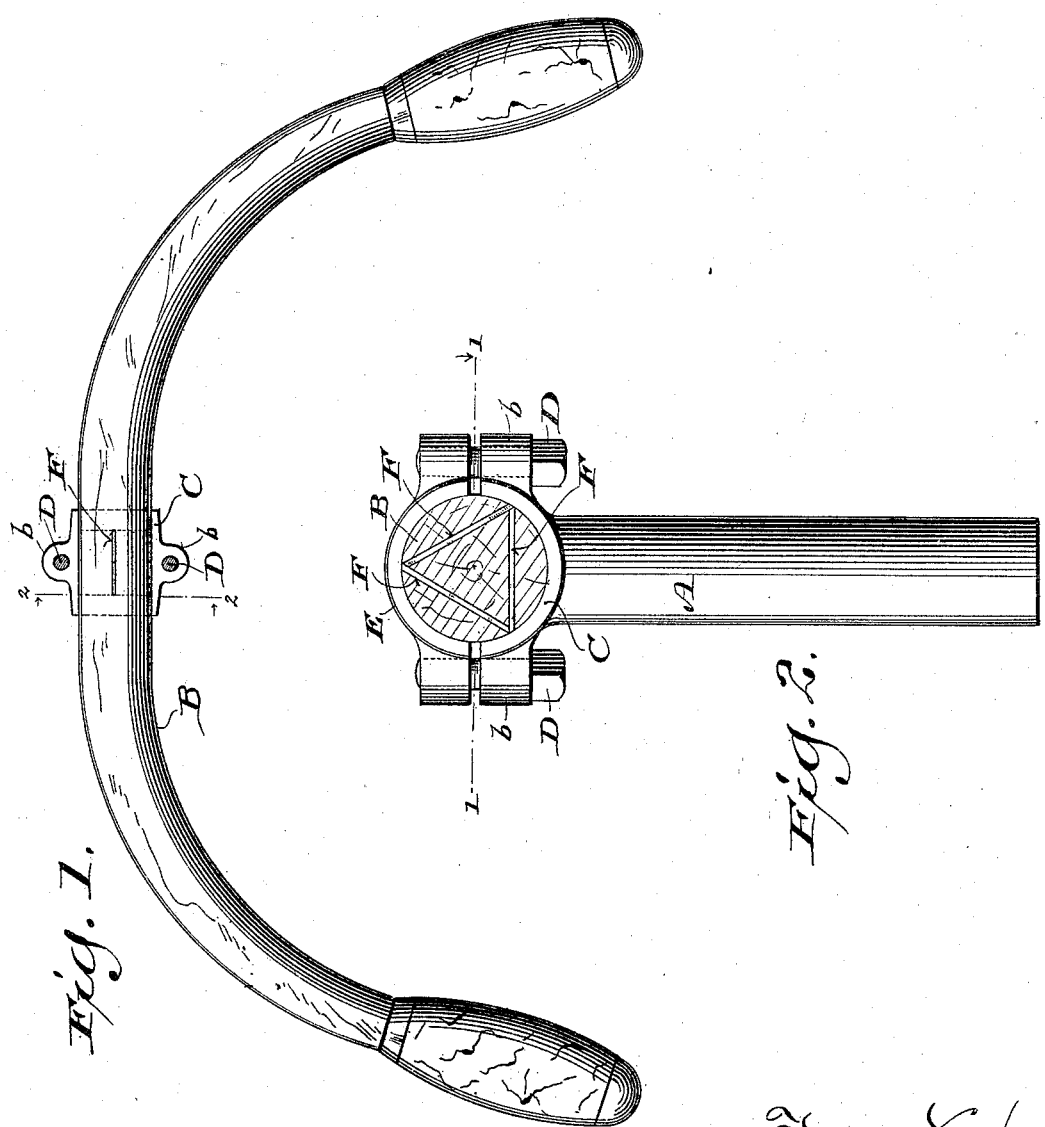

CHARLES S. BEEBE, OF RACINE, WISCONSIN.

BICYCLE.

SPECIFICATION forming part of Letters Patent No. 598,237, dated February 1, 1898.

Application filed June 13, 1896. Serial No. 595,420. (No model.)

*To all whom it may concern:*

Be it known that I, CHARLES S. BEEBE, a citizen of the United States, and a resident of Racine, in the county of Racine and State of Wisconsin, have invented certain new and useful Improvements in Bicycles; and I do hereby declare that the following is a full, clear, and exact description thereof.

My invention has especial reference to bicycle handle-bars; but it generically consists in providing a wood member of a bicycle with metal plates arranged therein to take clamp strain that would otherwise come upon the wood and to hold the said bar against rotary shift in the clamp, as will be hereinafter more fully set forth with reference to the accompanying drawings, and subsequently claimed.

In the drawings, Figure 1 represents a plan view of my invention in connection with a bicycle handle-bar, of wood, seated in a section of a clamp, the screws of the latter being in horizontal section on line 1 1 in the succeeding figure. Fig. 2 represents a side view of the handle-bar shank and clamp, with the handle-bar itself in transverse section on the line 2 2 in the preceding figure.

Referring by letter to the drawings, A represents a metal shank for a bicycle member, herein shown as being a wooden handle-bar B, this shank being usually a section of tubing having a head in the form of a seat or clamp section C for said handle-bar. The clamp-section C has lateral vertically-apertured ears *b* for bolt-headed screws D, that operate in like ears *c* of another metal clamp-section E to draw the latter tight on the handle-bar.

According to my invention the handle-bar is provided midway of its length with longitudinal kerfs for the reception of metallic plates F, arranged to have edgewise opposition to the clamp and thereby take the strain that would otherwise come upon the wood. The series of plates F form the sides of an angular figure the corners of which come in opposition to the clamp-sections, the plates herein shown being in triangular arrangement.

The employment of the metal plates, as above described, prevents indentation of the wood handle-bar by its clamp, and there being frictional contact of metal with metal said handle-bar is held against rotary shift in said clamp.

While my invention has especial reference to bicycle handle-bars of wood, the peculiarly-disposed metal plates may be utilized in connection with other wooden members of a bicycle to prevent their indentation or rotary shift when gripped by engaging metal portions of the vehicle.

Having now fully described my invention, what I claim as new, and desire to secure by Letters Patent, is—

1. A wooden handle-bar for bicycles, and a series of separate metal plates embedded in the bar to form an angular figure the corners of which come in opposition to a clamp for said bar.

2. A wooden handle-bar for bicycles, and a series of separate metal plates embedded in the bar to form a triangle the corners of which come in opposition to a clamp for said bar.

3. A wooden bicycle member having a series of separate metal plates embedded therein to form an angular figure arranged to have the corners thereof oppose a metal grip portion of the vehicle engaged by the aforesaid member.

4. A wooden bicycle member having a series of separate metal plates embedded therein to form a triangle arranged to have the corners thereof oppose a metal grip portion of the vehicle engaged by the aforesaid member.

In testimony that I claim the foregoing I have hereunto set my hand, at Racine, in the county of Racine and State of Wisconsin, in the presence of two witnesses.

CHARLES S. BEEBE.

Witnesses:
H. J. ROGERS,
W. H. DEAN.